United States Patent
Okuda et al.

[11] Patent Number: 5,973,463
[45] Date of Patent: Oct. 26, 1999

[54] DRIVING CONTROLLER FOR ELECTRIC VEHICLE

[75] Inventors: Kenzo Okuda, Toyota; Ryoji Mizutani, Aichi-ken, both of Japan

[73] Assignee: Toyota Jidosha Kabushiki Kaisha, Toyota, Japan

[21] Appl. No.: 08/914,213

[22] Filed: Aug. 19, 1997

[30] Foreign Application Priority Data

Sep. 10, 1996 [JP] Japan .................................. 8-238961

[51] Int. Cl.⁶ .................................................. B60K 28/10
[52] U.S. Cl. ........................... 318/430; 318/67; 318/432; 364/424.05; 180/282
[58] Field of Search ........................... 318/138, 430–439, 318/800–811; 180/65.1–65.6, 282, 65.8, 197; 364/424.05, 424.02, 424.06, 426.01, 426.02, 426.03

[56] References Cited

U.S. PATENT DOCUMENTS

| | | | |
|---|---|---|---|
| 4,985,837 | 1/1991 | Togai et al. | 364/426.02 |
| 5,069,181 | 12/1991 | Togai et al. | 123/399 |
| 5,276,624 | 1/1994 | Ito et al. | 364/424.05 |
| 5,481,168 | 1/1996 | Mutoh et al. | 318/432 |
| 5,492,508 | 2/1996 | Tsukamoto et al. | 475/125 |
| 5,549,172 | 8/1996 | Mutoh et al. | 180/65.1 |
| 5,650,700 | 7/1997 | Mutoh et al. | 318/432 |

FOREIGN PATENT DOCUMENTS

| | | |
|---|---|---|
| 62-138002 | 6/1987 | Japan . |
| 5-76106 | 3/1993 | Japan . |
| 5-91607 | 4/1993 | Japan . |

*Primary Examiner*—Paul Ip
*Attorney, Agent, or Firm*—Oblon, Spivak, McClelland, Maier & Neustadt, P.C.

[57] ABSTRACT

A driving controller of electric vehicles. An angular accelerative dimension error calculator calculates error information having a dimension of angular acceleration of a car body. A feedback torque calculator calculates the feedback torque on the basis of the error information according to the sign of a steering angle and the error information, and ON/OFF of an accelerator. A vehicle controller corrects the reference torque, determined according to an accelerator angle and braking force, by the feedback torque, and outputs the corrected reference torque toward motor controllers, thereby improving vehicle running safety.

4 Claims, 12 Drawing Sheets

DRIVING CONTROLLER FOR ELECTRIC VEHICLE

BACKGROUND OF THE INVENTION a) Field of the Invention

The present invention relates to an electric vehicle ( hereafter, called EV ), and especially to an EV provided with a vehicle running motor for every driving wheel, in other words, a wheel motor type EV. More particularly, the present invention relates to a driving controller which is mounted on board the wheel motor type EV in order to control the respective vehicle running motors.

b) Description on the Related Art

"Electric vehicle" is a general term for vehicles driven by electric motors. EVs can be classified according to types of power trains from the vehicle running motors to the respective driving wheels into one-motor type EVs, in which output of one common motor is distributed to right and left driving wheels via a differential gearing and the like, and wheel-motor type EVs, in which an electric motor is arranged to every driving wheel in order to drive the driving wheel corresponding to the electric motor. The wheel-motor type EV is superior to the one-motor type EV in several points. One superior point of the wheel-motor type EV is that such an EV requires only a small sized battery for supplying driving power to the electric motor because a torque transmission/distribution mechanism, such as a differential gearing, is unnecessary and energy consumption is small because of small transmission loss. A further advantage of the wheel-motor type EV is that the respective vehicle running motors can be made small because every electric motor drives only a driving wheel corresponding to that electric motor. A third advantage of the wheel-motor type EV is that integration level is increased (cabin space is enlarged) because the respective vehicle running motors can be built inside the respective driving wheels. The wheel-motor type EVs, in which the respective vehicle running motor are built inside the respective driving wheels, are hereafter called wheel-in-motor type EVs.

A fourth advantage of the wheel-motor type EV is that the output can be controlled separately for every driving wheel. The wheel-motor type EV disclosed in Japanese Patent Laid-Open Publication No. Hei. 5-91607, intend to improve vehicle straight line stability by utilizing this fourth advantage. Specifically, the wheel-motor type EV disclosed in Japanese Patent Laid-Open Publication No. Hei. 5-91607 is provided with a driving controller for separately controlling the rotational speed of the respective vehicle running motors. This driving controller first predicts the motion of the car body utilizing a vehicle motion model prepared beforehand when the expected reference number-of-rotation has actually been supplied to the respective vehicle running motors. In further detail, the yaw-rate of the vehicle about the center of gravity of the vehicle body, that is, the angular velocity of the car body in the yawing direction, is calculated on the basis of the detected values of both of the steering angle and the vehicle speed and according to the vehicle motion model. In Japanese Patent Laid-Open Publication No. Hei. 5-91607, the difference between the predicted yaw-rate derived in this way and the yaw-rate detected by a yaw-rate sensor is called yaw-rate noise. The driving controller disclosed in Japanese Patent Laid-Open Publication No. Hei. 5-91607 supplies the reference number-of-rotation corrected so as to reduce the yaw-rate noise to the respective vehicle running motors.

The yaw-rate noise in Japanese Patent Laid-Open Publication No. Hei. 5-91607 is the value obtained by subtracting unpredictable errors, such as shifts due to differences between dynamically loaded radiuses of right and left tires, difference between loads of right and left wheels, inclination and undulation of roads, wind direction, etc. in the detected values of the steering angle and the car speed from the detected yaw-rate. Therefore, if speed control as disclosed in Japanese Patent Laid-Open Publication No. Hei. 5-91607 can be achieved, straight line stability of a vehicle may be achieved against the respective factors mentioned above in addition to the difference between dynamically loaded radiuses of right and left tires.

However, the control disclosed in Japanese Patent Laid-Open Publication No. Hei. 5-91607 is in fact difficult to realize. First, in order to keep and improve the straight line stability of a vehicle, the predicted yaw-rate of the vehicle motion model should be estimated in real time so as to accurately reflect the behavior of an actual vehicle. On the other hand, EVs are designed so that the rotational speed of the vehicle running motors can be dynamically changed within the wide speed range in order to steadily realize the running speed and the acceleration/deceleration or the like required by a driver, in other words, in order to realize them so that the driver does not feel a sense of unnaturalness. Consequently, the rotational speed of the vehicle running motors and further the vehicle speed may largely or rapidly change in EVs. In such a state, the predicted yaw-rate of the vehicle motion model estimated on the basis of the detected car speed often does not fit the actual car speed. Taking into consideration further that control of electric motors over a wide speed range is difficult in general, it is seen that realization and effects of maintaining and improving the straight line stability of a vehicle according to the art disclosed in Japanese Patent Laid-Open Publication No. Hei. 5-91607 is difficult and limited.

Even if straight line stability of a vehicle can be improved by the control disclosed in Japanese Patent Laid-Open Publication No. Hei. 5-91607, perfect running safety of the vehicle can not be maintained and improved merely by improving the straight line stability of the vehicle. There are other important factors such as factors governing the running stability of a vehicle in the cases of speed changes, turns, and lane changes. In other words, in order to realize perfect running safety, control for maintaining the running stability of a vehicle against slip during speed changing, spin during turn, oversteer/understeer at lane changing is necessary. However, the control disclosed in Japanese Patent Laid-Open Publication No. Hei. 5-91607 can not accomplish perfect vehicle running stability. In other words, the control disclosed in Japanese Patent Laid-Open Publication No. Hei. 5-91607 can not cope with the above-mentioned negative factors such as slip during speed changing, because cornering powers Kf, Kr are presumed as constants, which in actuality, they vary with car speed, acceleration, and angular velocity.

SUMMARY OF THE INVENTION

A first object of the present invention is to provide a driving controller for wheel-motor type EVs which contributes toward improving vehicle running stability. In the present invention, the first object is achieved by utilizing the feature of the wheel-motor type EV that output of the respective driving wheels can be separately controlled because a vehicle running motor is provided for every driving wheel. A second object of the present invention is to provide a vehicle showing more excellent straight line stability and running stability than the vehicle disclosed in Japanese Patent Laid-Open Publication No. Hei. 5-91607, while maintaining various characteristics such as a wide speed range, and a quick response for various speed changing requirements. In the present invention, the second object is achieved by determining control parameters in such a way that speed changing, acceleration, deceleration, and force applied to a car body are taken into consideration. A third object of the present invention is to easily perform the control of the respective vehicle running motors. In the present invention, the third object is achieved by introducing a torque control instead of the speed control described in Japanese Patent Laid-Open Publication No. Hei. 5-91607. A fourth object of the present invention is to realize excellent running stability over the level of a conventional engine drive vehicle without controlling brake oil pressure or fuel injection quantity, in a way different from the arts such as traction control (TRC), or antilock brakes (ABS) adopted in conventional engine drive vehicles, in other words, without using exclusive controllers or hydraulic pressure distributing mechanisms. In the present invention, the fourth object is achieved by performing output control for every vehicle running motor. A fifth object of the present invention is to realize that a driving controller can execute the operations for improving the straight line stability and the running stability of a vehicle without driver pedal manipulation, in a way different from TRC and ABS in conventional engine drive vehicles. In the present invention, the fifth object is achieved by performing the control utilizing the output of a vehicle state detecting means (usually, various types of sensors).

One of the preferred embodiments of the present invention is a driving controller which is mountable on board a wheel-motor type EV provided with at least one driving wheel for a right side of the EV and at least one driving wheel for a left side. This driving controller is constituted first as an apparatus for executing the torque control: specifically, this driving controller is constituted as an apparatus for successively determining a reference torque for every vehicle running motor based on the driver's requirements and for controlling the output torque of the corresponding vehicle running motor taking the determined reference torque as a desired value. Therefore, according to the present invention, energy utilization efficiency can be improved, battery and respective vehicle running motor sizes can be decreased, and space utilization efficiency can be improved over conventional engine drive vehicles and one-motor type EVs. In addition, control of the respective vehicle running motors is easier than is the case with the driving controller disclosed in Japanese Patent Laid-Open Publication No. Hei. 5-91607.

In addition, the driving controller according to the present embodiment is provided with the following means in order to improve the running stability of the vehicle by controlling the output torque of every vehicle running motor: a means for directly or indirectly detecting acceleration or angular acceleration of the vehicle; a means for detecting US-OS characteristics; a reference torque correction means for correcting the reference torque on the basis of the acceleration or the angular acceleration so that the US-OS characteristics shift toward the neutral steer when the US-OS characteristics show a tendency to deviate from the neutral steer. In other words, the present embodiment shifts the US-OS characteristics toward the neutral steer by correcting the reference torque, that is, the desired value of the output torque for the respective vehicle running motors on the basis of the acceleration or the angular acceleration of the vehicle when the US-OS characteristics show a tendency to deviate from the neutral steer.

Either of the above-mentioned acceleration and angular acceleration is generated by speed changing, turning, and lane changing of a vehicle. Cornering stiffness depends upon the product of the correction amount of the reference torque and its output duration. Consequently, spin, out-of-course, and wheel slip and lock at start and stop or the like or various types of instability may possibly cause these phenomena can be eliminated or prevented by the above-mentioned reference torque correction. As a result, running safety, including the straight line stability and the running stability described in the present embodiment and especially vehicle running stability, are improved over that in EVs disclosed in Japanese Patent Laid-Open Publication No. Hei. 5-91607. In addition, when these advantages are realized, a controller or a mechanism for controlling brake oil pressure and fuel injection quantity different from TRC, ABS, or the like of conventional engine drive vehicles are not necessary. Therefore, the present embodiment is more inexpensive and space-saving than TRC and ABS in conventional engine drive vehicles. In addition, because the reference torque is corrected on the basis of the directly or indirectly detected acceleration or deceleration, control is executed before a driver feels acceleration or deceleration. It should be noted that ABS of a conventional engine drive vehicle does not operate unless a driver transfers his foot from an accelerator pedal to a brake pedal after feeling acceleration or deceleration. In the present embodiment, because the control corresponding to TRC, ABS, or the like is executed without pressing the brake pedal (in other words, while still stepping on the accelerator pedal), operability of the vehicle is improved as compared with conventional EVs.

In a second preferred embodiment of the present invention, the reference torque correction means comprises a means for determining an absolute value of the reference torque correction value so as to increase with the increase of the acceleration or the angular acceleration on the basis of the detected value of the acceleration or the angular acceleration, a means for determining a sign of the reference torque correction value (for example, a sign of the gain to be multiplied by the absolute value of the reference torque correction value) according to the US-OS characteristics so that the reference torque for the outside driving wheel relatively decreases after correction as compared with the reference torque for the inside driving wheel in the case of oversteer, and on the contrary, increases in the case of understeer, and a means for adding the reference torque correction value to the reference torque. Thus, correction of the reference torque can be easily achieved by independently executing the determination of the absolute value and the sign of the reference torque correction value. In addition, since the absolute value of the reference torque correction value is determined so as to not be constant, but so as to increase with the increase of the acceleration or the angular acceleration, it is possible to quickly and suitably shift the US-OS characteristics of the EV toward neutral steer.

A third embodiment of the present invention comprises a means for halting the correction when the acceleration or the angular acceleration is sufficiently small. That is to say, when the acceleration or the angular acceleration of a vehicle is small, it seems that the degree of instability of the vehicle due to the acceleration or the angular acceleration is small. In such a case, the control system can be simplified by halting the correction of the torque command. In addition, such a countermeasure can be executed without using a hydraulic control unit, in other words, without a time lag in the hydraulic transmission, different from TRC, ABS, and the like in conventional engine drive vehicles. Consequently, there is no occurrence of such a phenomenon as the reference torque correction continues for a while because of the time lag of the control system in spite of sufficiently small acceleration or angular acceleration of a vehicle.

A fourth preferable embodiment of the present invention comprises a means for detecting slip ratios of the respective driving wheels and a means for halting the correction when the slip ratio of the corresponding driving wheel is not sufficiently small. That is to say, the correction of the reference torque more or less causes a discrepancy between the wheel speed (in the present application, defined as the vehicle speed converted from a wheel speed,) and the body speed (in the present application, defined as the vehicle speed obtained by averaging the values of right and left wheel speeds) according to road surface conditions mainly such as coefficient of friction. Therefore, if the correction of the reference torque is halted when the slip ratio of a driving wheel is large, the occurrence of the slip due to the correction of the reference torque can be prevented regardless of road surface conditions.

DETAILED DESCRIPTION OF THE PREFERRED EMBODIMENTS

Preferred embodiments of the present invention will now be described with reference to the accompanying drawings.

(1) System Configuration

Figure 1:
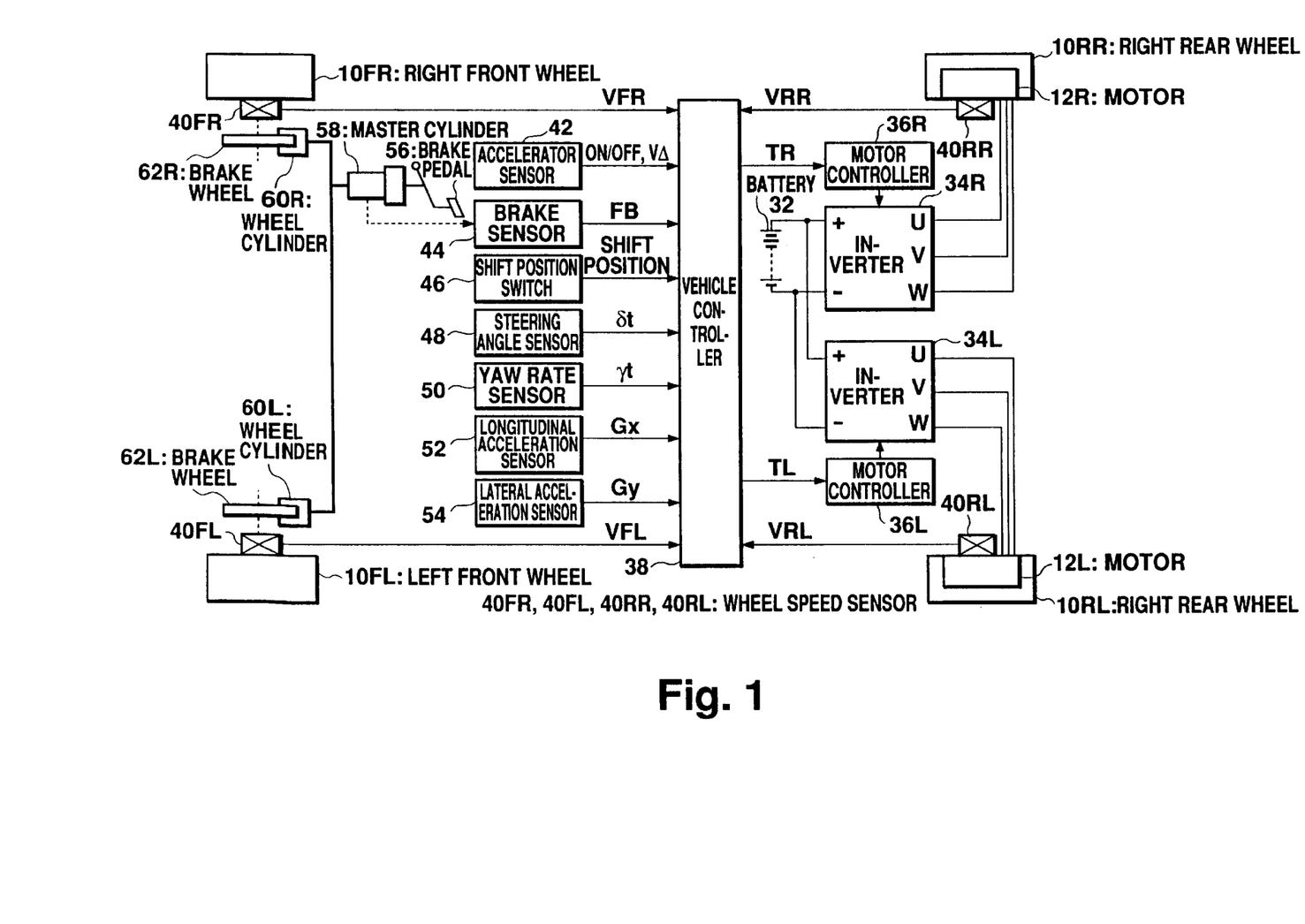
FIG. 1 is a block diagram showing functional constitution of a vehicle of one embodiment of the present invention.
Figure 2A:
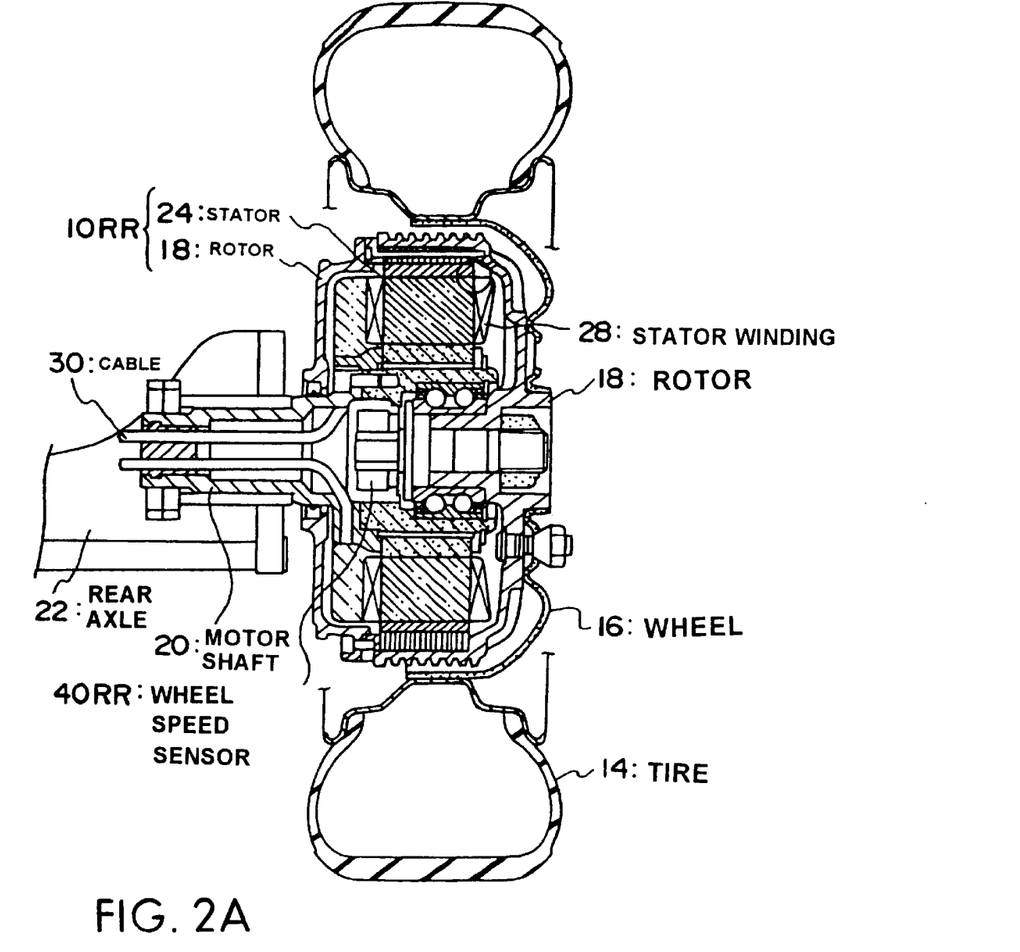
FIG. 2 is an axial cross section of a driving wheel showing structure of a vehicle running motor.
Figure 2B:
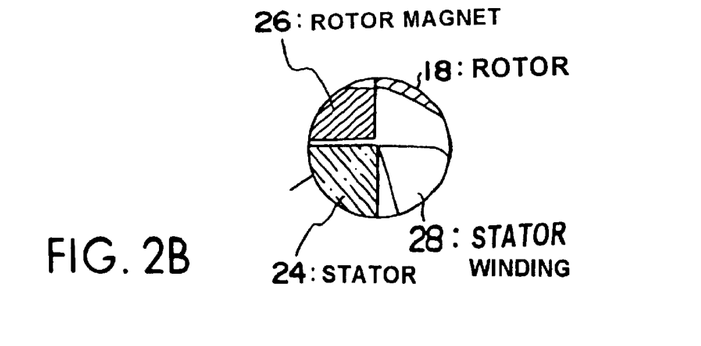

A system configuration of a wheel-motor type EV suitable for the embodiment of the present invention is shown in FIG. 1. This EV is a rear-wheel-drive vehicle; that is, right rear wheel 10 RR and left rear wheel 10RL are driving wheels, and right front wheel 10 FR and left front wheel 10FL are driven wheels. Vehicle running motors 12R and 12L are assembled inside corresponding right rear wheel 10RR and left rear wheel 10RL respectively. The assembled wheel is shown in FIG. 2 taking right rear wheel 10RR as an example. In this figure, rotor 18 is fixed to the inside of wheel 16 so as to rotate together with tire 14. Stator 24 is fixed to rear axle 22 via motor shaft 20 and engaged with rotor 18 via a bearing or the like. In addition, rotor magnet 26 made of a permanent magnet is fixed to the inside wall of rotor 18 so as to face stator 24 with small clearance. In addition, stator winding 28 is wound on stator 24. Cable 30 for supplying electric current to stator winding 28 are connected to stator winding 28 through the inside of motor shaft 20. In such a configuration, rotor 18 rotates and generates the propulsive power of the vehicle by supplying AC current to stator winding 28 via cable 30.

Battery 32 shown in FIG. 1 is a driving power supply source to motors 12R and 12L. Current discharged from battery 32 is supplied, on the one hand, to motor 12R via inverter 34R and on the other hand, to motor 12L via inverter 34L respectively. Inverters 34R and 34L are a kind of electric power converters and convert the discharged power (DC) from battery 32 to a power type (three phase alternating current in this figure) suitable for motors 12R and 12L under the control of corresponding motor controllers 36R and 36L. Motor controller 36R controls the corresponding inverter 34R according to reference torque TR output from vehicle controller 38 so that the corresponding motor 12R outputs the real torque corresponding to the reference torque TR. In the same way, motor controller 36L controls the corresponding inverter 34L according to reference torque TL output from vehicle controller 38 so that the corresponding motor 12R outputs the real torque corresponding to the reference torque TL. Motor controllers 36R and 36L also have a function for separating the corresponding inverters 24R, 34L and vehicle controller 38 by insulation. Control of inverters 34R and 34L by motor controllers 36R and 36L may be performed on the basis of the values of the current in the respective phases of motors 12R and 12L detected by current sensors not shown in the figure or estimated by rotor angular positions and the like.

Vehicle controller 38 is a control unit for functions such as the output torque control of motors 12R and 12L, state monitoring and control of the respective onboard components, the transmission of vehicle conditions to a crew, and the like. This controller can be realized by modifying the software of a conventional electronic control unit: ECU. Output from various kinds of sensors provided on various parts of the vehicle is input into vehicle controller 38 and is utilized for controlling the motor output and monitoring the vehicle conditions.

For example, wheel speed sensors (such as resolvers) 40RR and 40RL provided in the right and left rear wheels (16 in FIG. 2) detect wheel speeds VRR and VRL of the right and left rear wheels. Vehicle controller 38 determines reference torque TR and TL by utilizing wheel speeds VRR and VRL as motor speed information NR and NL. Wheel speed sensors 40FR and 40FL provided in the right and left front wheels detect wheel speeds VFR and VFL. Vehicle controller 38 calculates body speed VS on the basis of wheel speeds VFR and VFL. Accelerator sensor 42 detects the displacement of the accelerator pedal (not shown in the figure), that is, accelerator angle VA. Brake sensor 44 detects the displacement of brake pedal 56, that is, braking force FB. Shift position switch 46 detects the shifted range (in the case of an engine brake range or the like, shift lever position in this range) of a shift lever (not shown in the figure), that is , the shift position. Steering angle sensor 48 detects steering angle δt varying with the handling of a steering wheel (not shown in the figure). Vehicle controller 38 realizes the travel of the vehicle so as to meet a driver's will by generating various control signals including reference torque TR and TL on the basis of the detected accelerator angle VA, braking force FB, shift position, and steering angle δt. Yaw rate sensor 50, longitudinal acceleration sensor 52, and lateral acceleration sensor 54 are used for detecting yaw rate γt, longitudinal acceleration Gx or lateral acceleration Gy. The detected values are used for the vehicle travel safety control to be described later. In this case, vehicle controller 38 does not need to use output of all provided sensors. It is enough to use output of the sensors selected so as to meet the object of the control to be executed. In addition, output of other sensors not shown in the figure may also be used.

Figure 3:
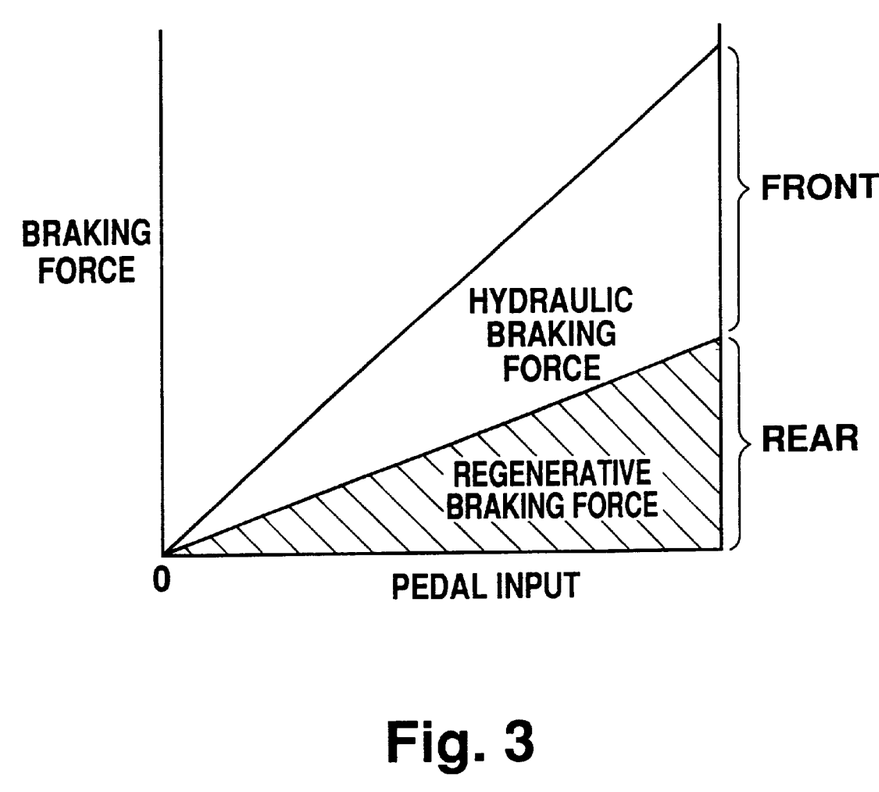
FIG. 3 is a figure showing distribution of braking force.

In the system shown in FIG. 1, a brake system such as hydraulic braking is used for the front wheels and regenerative braking is used for the rear wheels is used. That is to say, when a driver first presses down on brake pedal 56, hydraulic pressure is generated in master cylinder 58. The generated hydraulic pressure is transmitted to right and left wheel cylinders 60R and 60L, and applied to right and left brake wheels 62R and 62L. As a result, braking torque acts on the right and left front wheels 10FR and 10FL. On the other hand, brake sensor 44 detects the hydraulic pressure in master cylinder 58 as braking force FB, and vehicle controller 38 generates reference torque TR and TL which has a the magnitude corresponding to braking force FB and belongs to the regeneration range. Consequently, the braking force in the vehicle shown in FIG. 1 is distributed so that both of the hydraulic braking force and the regenerative braking force increase with the increase of braking force FB (pedal input on the horizontal axis) as shown in FIG. 3. In the present embodiment, the brake system is separated into a hydraulic brake system and a regenerative brake system after brake sensor 44. Consequently, if either the hydraulic brake system or the regenerative brake system fails, it is possible to evacuate the vehicle using another brake system. In addition, because mechanical elements such as a valve, a pump, and electric systems for driving and controlling the mechanical elements are not used in this hydraulic system, system configuration of the present embodiment is simplified.

One reason that mechanical elements such as a valve or a pump, as well as electric systems for driving and controlling the mechanical elements are not necessary in this hydraulic system is that brake oil pumping, which is indispensable to a conventional ABS and the like, is not necessary because the vehicle travel safety control can be performed in the present embodiment utilizing the control of the output torque from motors 12R and 12L as described later.

(2) Outline of Functions of Vehicle Controller

Figure 4:
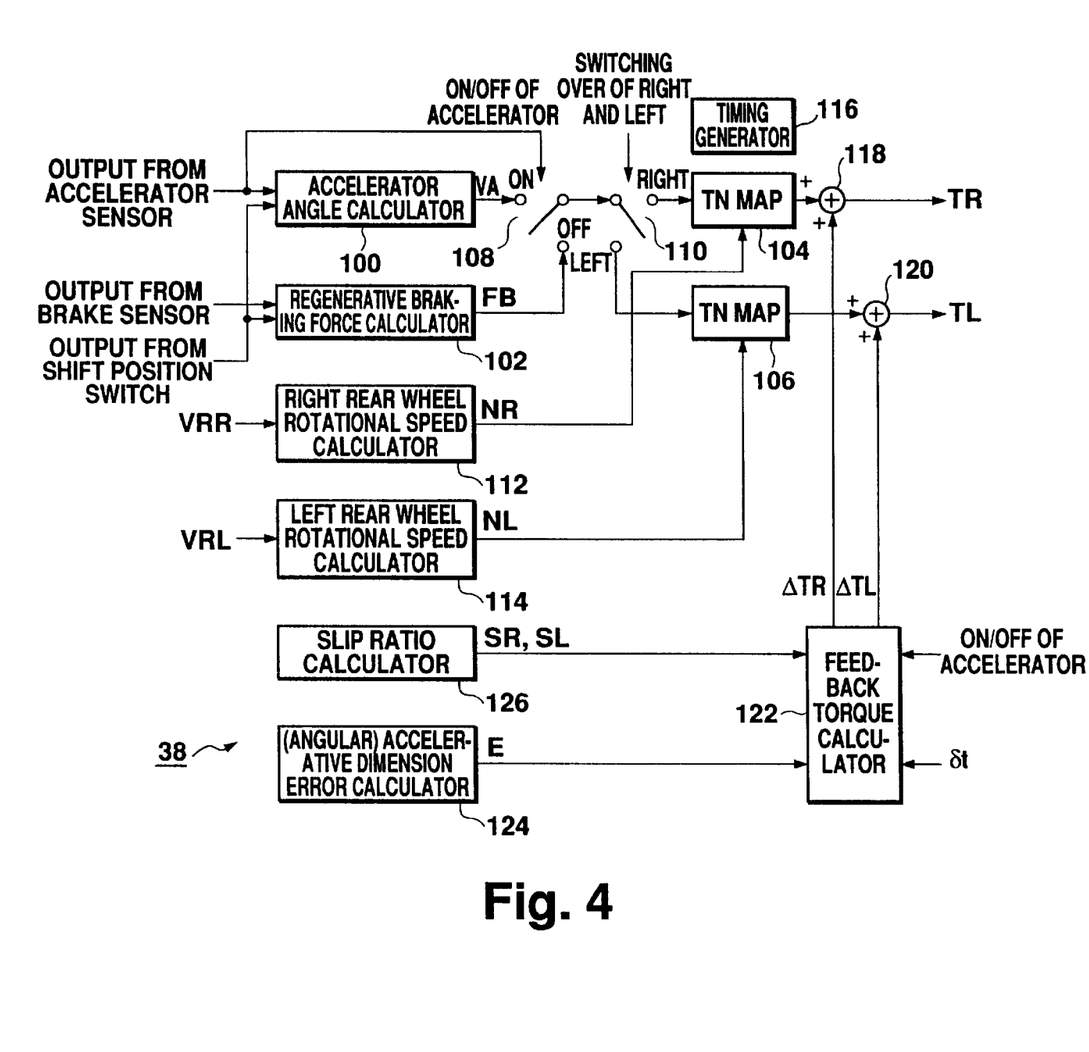
FIG. 4 is a block diagram showing functional constitution of a vehicle controller.
Figure 5:
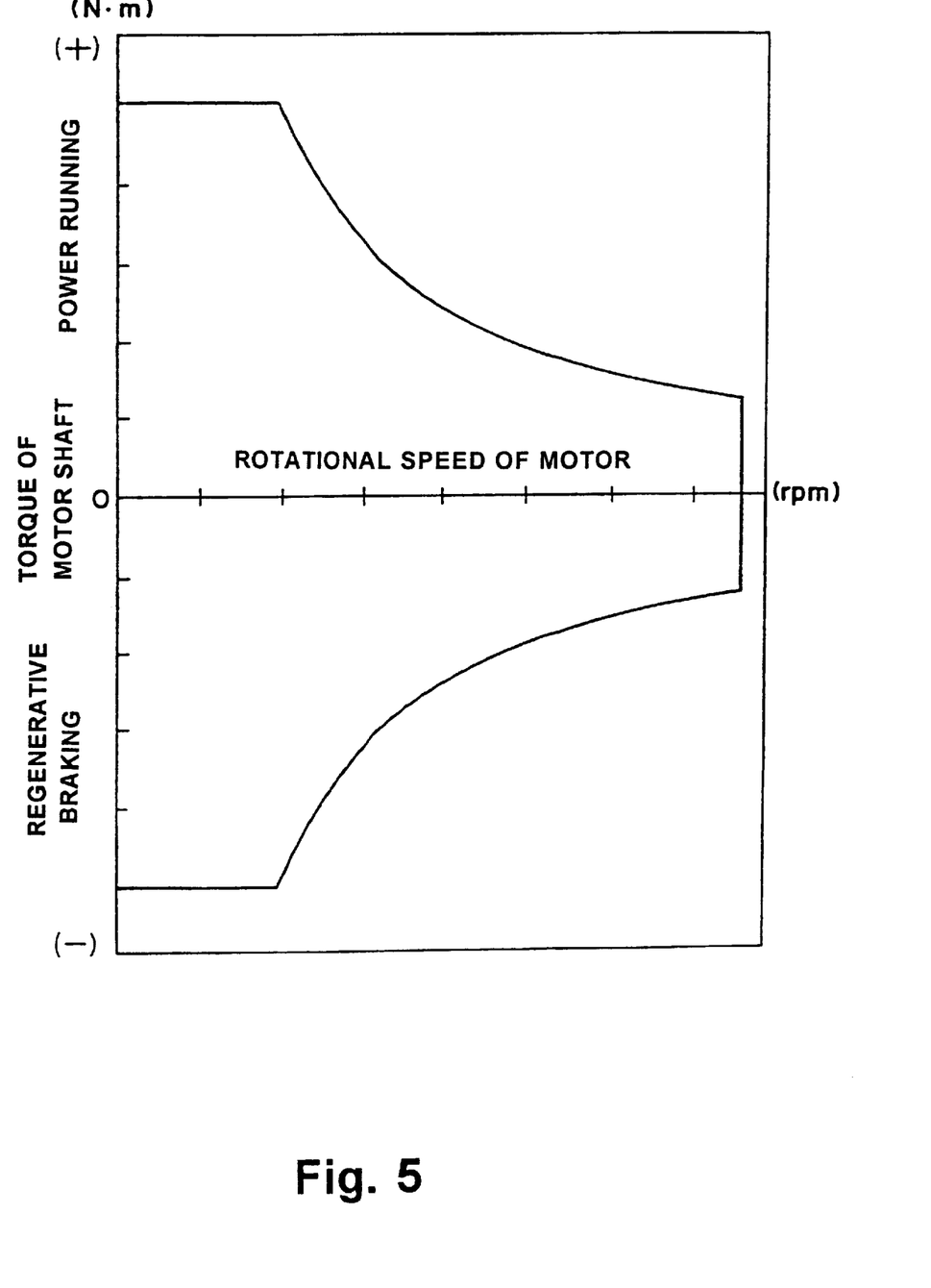
FIG. 5 is a figure showing an example of a TN map.

An outline of the functions of vehicle controller 38 is shown in FIG. 4. Accelerator angle calculator 100 shown in FIG. 4 converts the output signals from accelerator sensor 42 into numerical data representing accelerator angle VA. Regenerative braking force calculator 102 converts the output signals from brake sensor 44 into numerical data representing braking force FB. In this case, accelerator angle calculator 100 and regenerative braking force calculator 102 give an adjustment or a modification to the converted results on the basis of the shift position to be detected by shift position switch 46. TN map 104 is a map for defining a characteristic of rotational speed vs. maximum output torque of motor 12R, and TN map 106 is a map for defining a characteristic of rotational speed vs. maximum output torque of motor 12L. An example of the characteristics to be defined by TN maps 104 and 106 is shown in FIG. 5.

In addition, in FIG. 4, switches 108 and 110 are provided between a group of TN maps 104, 106 and a group of accelerator angle calculator 100 and regenerative braking force calculator 102. Switch 108 switches over according to the output from accelerator sensor 42 so as to supply a signal of accelerator angle VA to switch 110 side when the driver is considered to step on the accelerator pedal by judging the situation of accelerator angle VA (accelerator ON), and so as to supply braking force FB to switch 110 side when the driver is not considered to step on the accelerator pedal (accelerator OFF). Of course, switch 108 may be used so as to switch over according to the output from brake sensor 44 in order to supply a signal of braking force FB to switch 110 side when the driver is considered to step on brake pedal 56 judging the situation of braking force FB (brake ON), and in order to supply a signal of accelerator angle VA to switch 110 side when the driver is not considered to step on brake pedal 56 (brake OFF). Switch 110 is a switch for switching over the destination of accelerator angle VA and brake force FB. Timing generator 116 is provided to control the switching. Timing generator 116 generates the timing for calculating reference torque TR by TN map 104 on the basis of accelerator angle VA and braking force FB, and the timing for calculating reference torque TL by TN map 106 on the basis of accelerator angle VA and braking force FB, alternately and at a required speed. In the present embodiment, calculation of the torque commands is alternately executed by time sharing method for right and left sides.

For example, when accelerator angle VA has been supplied to TN map 104 via switches 108 and 110, vehicle controller 38 determines reference torque TR by allocating the maximum power running torque (values on the upper curve shown in FIG. 5) at rotational speed NR of right rear wheel 10RR at that time in proportion to the value of accelerator angle VA. When braking force FB has been supplied to TN map 104 via switches 108 and 110, vehicle controller 38 determines reference torque TR by allocating the maximum regenerative braking torque (values on the lower curve shown in FIG. 5) at rotational speed NR of right rear wheel 10RR at that time in proportion to the value of braking force FB. Determination of torque command TL can be executed using TN map 106 in the same way as that in the determination of reference torque TR except to replace right with left. Rotational speed NR necessary for determining reference torque TR is calculated by right rear wheel rotational speed calculator 112, and rotational speed NL necessary for determining reference torque TL is calculated by left rear wheel rotational speed calculator 114. These calculations are calculations for converting wheel speeds VRR and VRL to rotational speeds NR and NL using the radius of tire 14.

Reference torques TR, TL determined by TN maps 104, 106 are usually output to motor controllers 36R, 36L without any modification. However, when required conditions have been satisfied, feedback torques ΔTR, ΔTL separately determined by calculation are added to the reference torques TR, TL using adders 118, 120 respectively, and the results of addition, TR+ΔTR and TL+ΔTL, are output to motor controllers 36R, 36L as modified reference torques TR, TL.

Feedback torque calculator 122 shown in FIG. 4 calculates ΔTR and ΔTL on the basis of the signals such as ON/OFF of the accelerator, sign of steering angle δt (turning directions), and error information E, when error information E and slip ratios SR, SL of right and left rear wheels satisfy required conditions, and outputs the calculated feedback torques ΔTR, ΔTL for the required duration. (Angular) accelerative-dimension error calculator 124 calculates error information E. Slip ratio calculator 126 calculates slip ratios SR, SL.

(3) Details of Functions of Vehicle Controller

Figure 6:
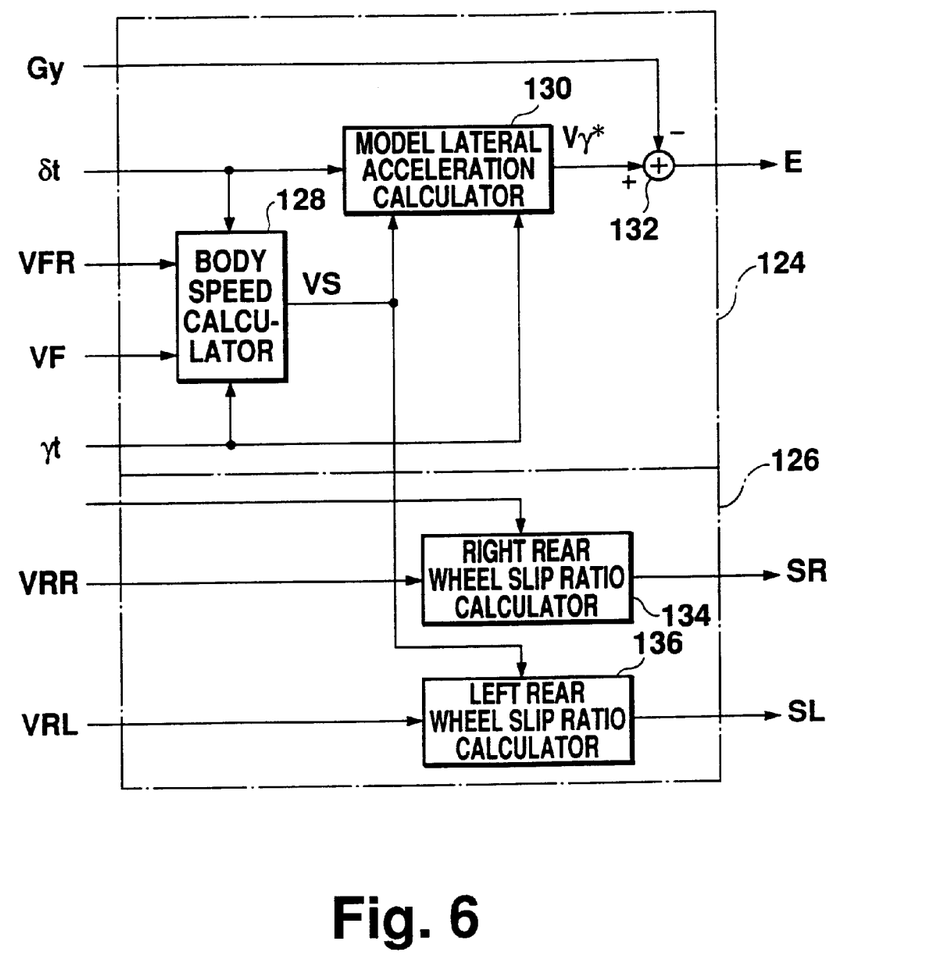
FIG. 6 is a block diagram showing functional constitution of an (angular) accelerative-dimension error calculator and a slip ratio calculator.

Functional configurations of (angular) accelerative-dimension error calculator 124 and slip ratio calculator 126 are shown in FIG. 6. (Angular) accelerative-dimension error calculator 124 comprises body speed calculator 128, model lateral acceleration calculator 130, and adder 132. Slip ratio calculator 126 comprises right rear wheel slip ratio calculator 124 and left rear wheel slip ratio calculator 136.

Figure 7:
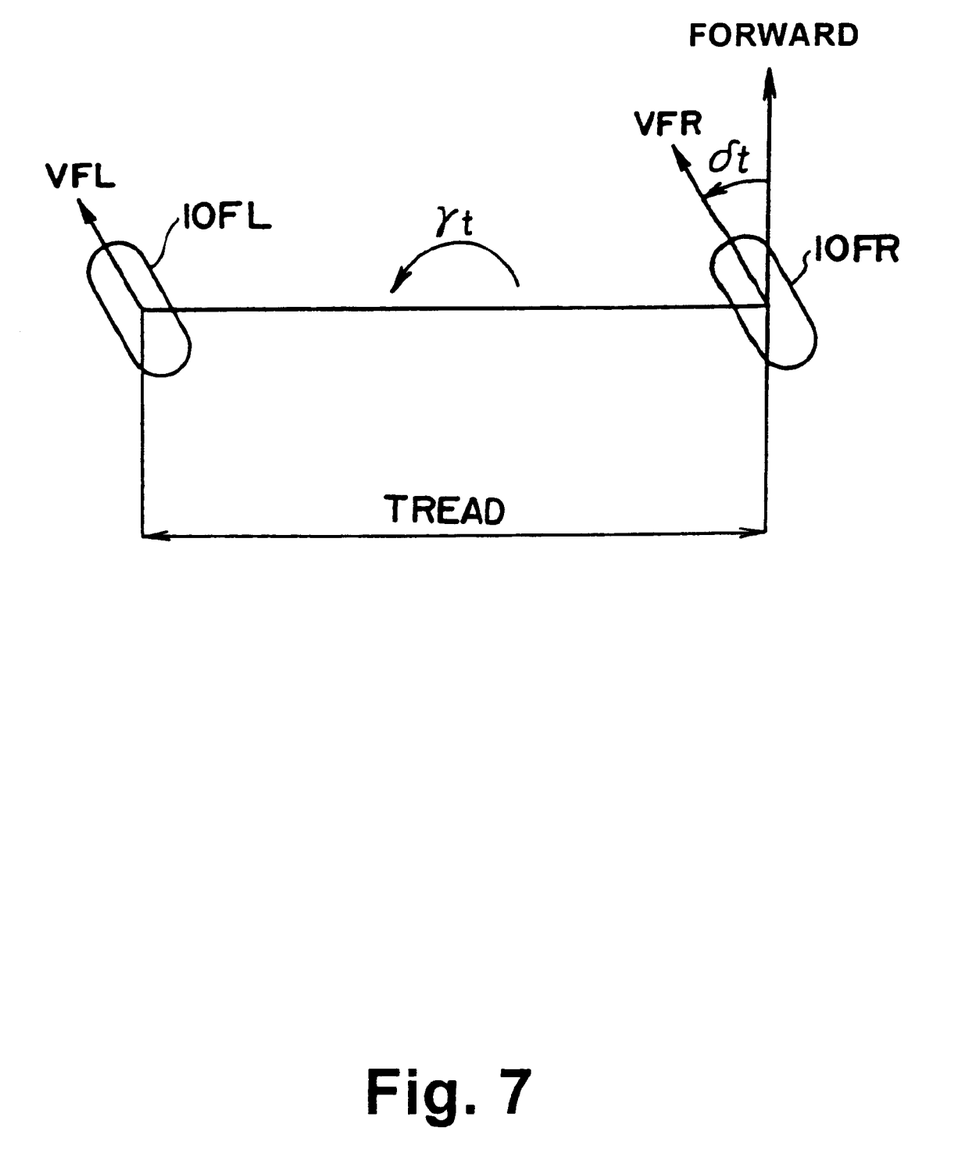
FIG. 7 is a figure showing a definition of tread and others.

First, body speed calculator 128 calculates body speed VS which is necessary for obtaining model lateral acceleration $V\gamma^*$ and slip ratios SR, SL using the following equations, $$VS=(VRF+VFL-\cos \delta t \cdot \gamma t \cdot TREAD)/2 \ldots \text{for turn left } (\delta t \geq 0),$$

$$VS=(VFR+VFL-|\cos \delta t \cdot \gamma t \cdot TREAD|)/2 \ldots \text{for right turn } (\delta t<0) \quad (1),$$

where TREAD shows a tread (see FIG. 7). The term (VFR+VFL)/2 in Eq. (1) is a term for obtaining the average wheel speed of the right and left front wheels. The remainder is a term for eliminating the effects of yaw rate γt.

Model lateral acceleration calculator 130 calculates model lateral acceleration $V\gamma^*$ using the following equation, $$V\gamma^*=[\gamma t-VS\cdot\delta t/\{L\cdot(1+A\cdot VS^2)\}]\cdot VS \quad (2),$$

where L is a wheel base and A is a stability factor obtained beforehand by a cornering performance test. Adder 132 calculates error information $E=V\gamma^*-Gy$ by subtracting lateral acceleration Gy from model lateral acceleration $V\gamma^*$ and supplies E to feedback torque calculator 122.

Right rear wheel slip ratio calculator 134 and left rear wheel slip ratio calculator 136 calculate slip ratios SR, SL using the following equations, $$SR=|(VRR-VS)/VS|,$$

$$SL=|(VRL-VS)/VS| \quad (3),$$

and supply SR and SL to feedback torque calculator 122.

Figure 8:
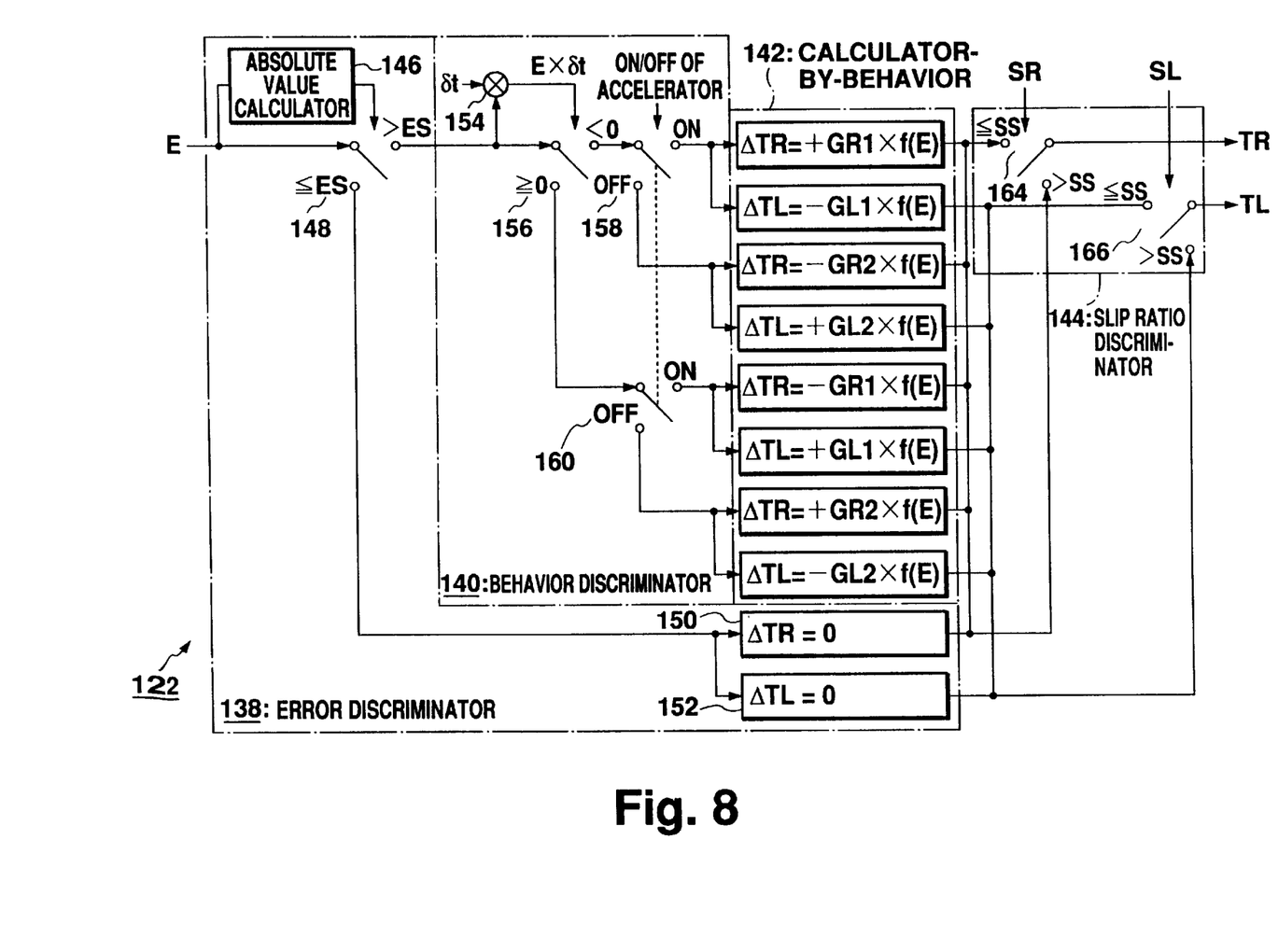
FIG. 8 is a block diagram showing functional constitution of a feedback torque calculator.

A functional configuration of feedback torque calculator 122 is shown in FIG. 8. Feedback torque calculator 122 comprises error discriminator 138, behavior discriminator 140, calculator-by-behavior 142, and slip ratio discriminator 144.

Error discriminator 138 comprises absolute value calculator 146 for calculating absolute value |E| of error information E, switch 148 for supplying error information E to behavior discriminator 140 when absolute value |E| exceeds predetermined reference value ES, and feedback torque forced clearing parts 150, 152 for forcedly setting feedback torques ΔTR, ΔTL to zero. That is to say, when absolute value |E| is sufficiently small, the vehicle can be considered to be in a sufficiently stable running state. In this case, correction of TR, TL by feedback torques ΔTR, ΔTL is stopped or omitted.

Behavior discriminator 140 comprises multiplhier 154 and three switches 156, 158, and 160. Multiplier 154 calculates a product (E·δt) of error information E and steering angle δt. Switch 156 supplies error information E to switch 158 when (E·δt)<0, and to switch 160 when (E·δt)≧0. Switches 158, 160 switch over the destination of error information E respectively according to ON/OFF of the accelerator. That is to say, behavior discriminator 140 discriminates the behavior of the vehicle at present concerning the following three points as shown in the left half of Table 1; sign of error information E (mode of appearance of control error), sign of steering angle (turning direction of vehicle), and ON/OFF of accelerator (power running or regenerative braking).

TABLE 1

| | State of vehicle | | | Direction of control | |
|---|---|---|---|---|---|
| | δt | E | US-OS characteristics | ΔTR | ΔTL |
| During power running | + | + | over steer | − | + |
| | + | − | under steer | + | − |
| | − | + | under steer | − | + |
| | − | − | over steer | + | − |
| During braking | + | + | over steer | + | − |
| | + | − | under steer | − | + |
| | − | + | under steer | + | − |
| | − | − | over steer | − | + |

Calculator-by-behavior 142 determines feedback torque ΔTR, ΔTL on the basis of either of the following equations according to the result discriminated by behavior discriminator 140, $$\Delta TR=+GR1\cdot f(E), \Delta TL=-GL1\cdot f(E) \ldots \text{for } E\cdot\delta t<0 \text{ and accelerator ON,}$$

$$\Delta TR=-GR2\cdot f(E), \Delta TL=+GL2\cdot f(E) \ldots \text{for } E\cdot\delta t<0 \text{ and accelerator OFF,}$$

$$\Delta TR=-GR1\cdot f(E), \Delta TL=+GL1\cdot f(E) \ldots \text{for } E\cdot\delta t\geq 0 \text{ and accelerator ON,}$$

$$\Delta TR=+GR2\cdot f(E), \Delta TL=-GL2\cdot f(E) \ldots \text{for } E\cdot\delta t\geq 0 \text{ and accelerator OFF} \quad (4).$$

In addition, it is desirable that f (E) is a monotone increasing function of E like exp (E). All of the gains, GR1, GL1, GR2, and GL2, in the upper equations have positive values.

Figure 9:
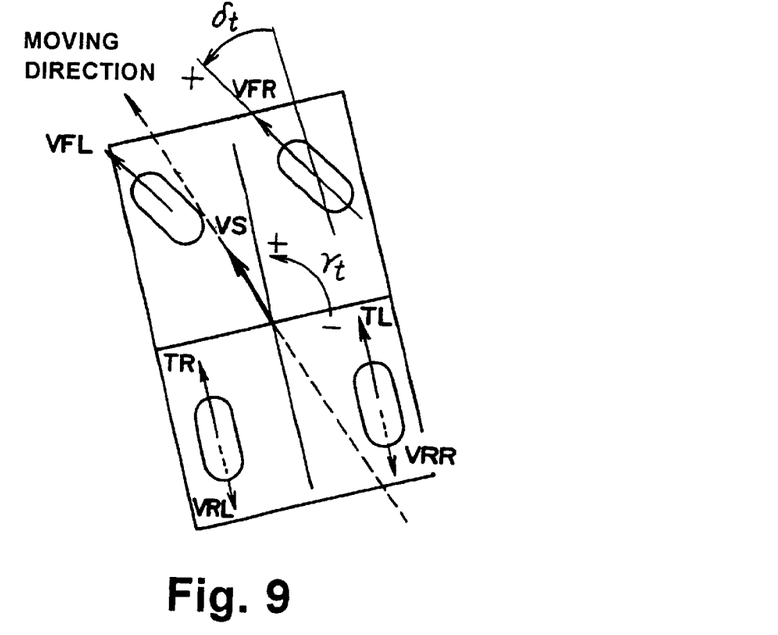
FIG. 9 is a figure showing an example of behavior of a vehicle.
Figure 10:
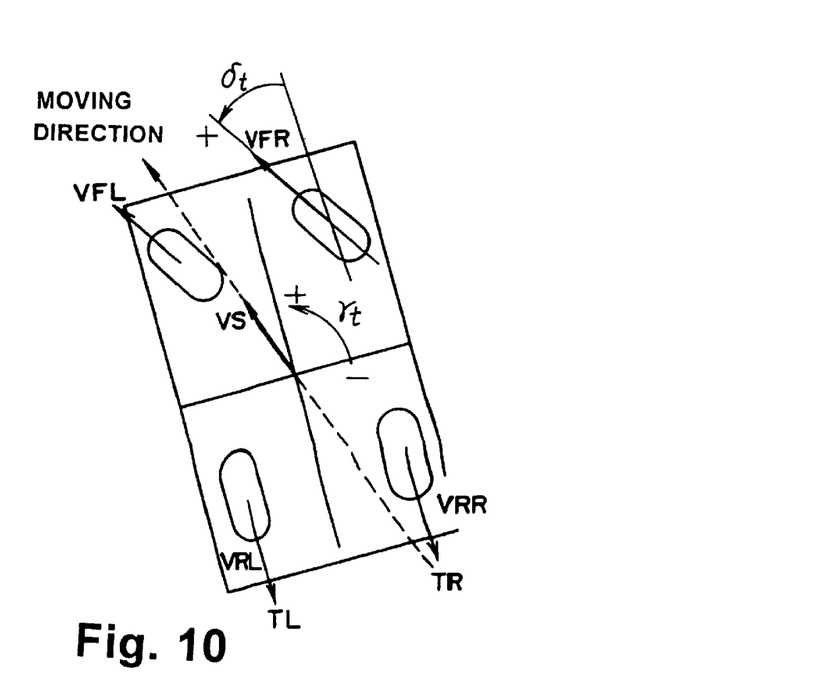
FIG. 10 is a figure showing an example of behavior of a vehicle.

Feedback torques ΔTR, ΔTL are determined according to the sign of E·δt and ON/OFF of accelerator in order to realize the following control. If the vehicle is making a left turn (δt>0), and running by power (TR>0 and TL>0) as shown in FIG. 9, and if lateral acceleration Gy of the car body is smaller than model lateral acceleration Vδ* (E>0), US-OS characteristics is considered to be shifting toward a state of over steer. In order to return to a state of neutral steer, output power running torque toward an inside driving wheel, in this case left rear wheel 10RL, should be increased, and power running torque toward an outside driving wheel, in this case right rear wheel 10RR, should be decreased. Therefore, in the present embodiment, when the accelerator is ON, E>0, and δt>0, feedback torque ΔTR is taken to be negative, and ΔTL is taken to be positive. Next, if the vehicle is making a left turn (δt>0), and running with regenerative braking (TR<0 and TL<0) as shown in FIG. 10, and if lateral acceleration Gy of the car body is smaller than model lateral acceleration $V\gamma^*$ (E>0), US-OS characteristics is considered to be shifting toward a state of over steer. In order to return this state to a state of neutral steer, output regenerative torque toward an inside driving wheel, in this case left rear wheel 10RL, should be decreased, and output regenerative torque toward an outside driving wheel, in this case right rear wheel 10RR, should be increased. Therefore, in the present embodiment, when the accelerator is OFF, E>0, and δt>0, feedback torque ΔTR is taken to be positive, and ΔTL is taken to be negative. The signs of ΔTR and ΔTL are different from those of the case shown in FIG. 9 because regenerative torque is negative torque, and an increase of regenerative torque means a decrease of reference torque and a decrease of regenerative torque means an increase of reference torque.

An outline of the logic for determining feedback torques ΔTR, ΔTL by calculator-by-behavior 142 is summarized in the right half of Table 1. As can be understood from the left half of Table 1, when sign of error information E coincides with that of steering angle δt, the vehicle is in a state of over steer, and when sign of error information E does not coincide with that of steering angle δt, the vehicle is in a state of under steer. Therefore, behavior discriminator 140 discriminates the coincidence of both signs on the basis of the sign of E·δt.

Feedback torques ΔTR, ΔTL determined by calculator-by-behavior 142 or feedback torques ΔTR, ΔTL forcedly set to zero by error discriminator 138 are output to adders 118, 120 via slip ratio discriminator 144. Slip ratio discriminator 144 comprises switch 164 for forcedly setting feedback torque ΔTR to zero when SR>SS (SS is a predetermined reference value.), and switch 166 for forcedly setting feedback torque ΔTL to zero when SL>SS. The reason why the feedback torque is set to zero when the slip ratio is high because addition and subtraction of the feedback torque to the reference torque may cause slip. Therefore, in the present embodiment, generation of the slip due to the correction of reference torque is prevented by providing slip ratio discriminator 144.

(4) Advantages of the Present Invention

Figure 11:
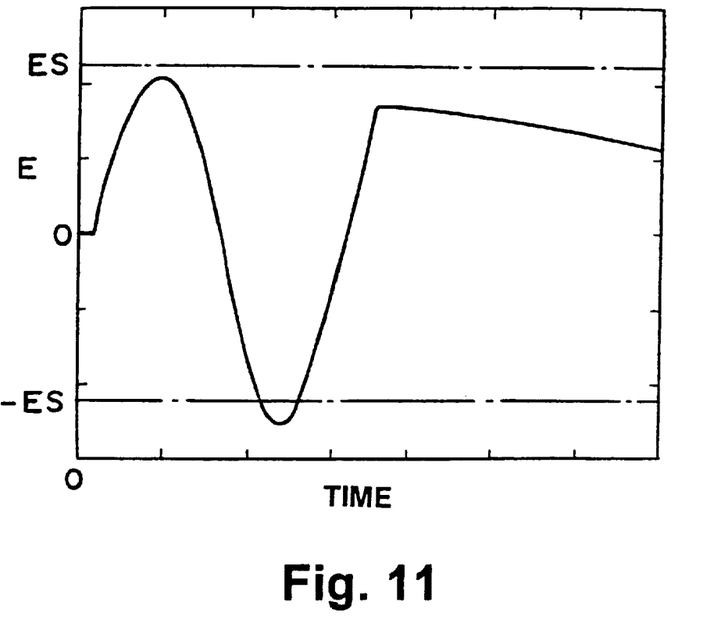
FIG. 11 is a figure showing an example of behavior of a conventional vehicle in lane changing, particularly time variation of control errors, in comparison with the present embodiment.
Figure 12:
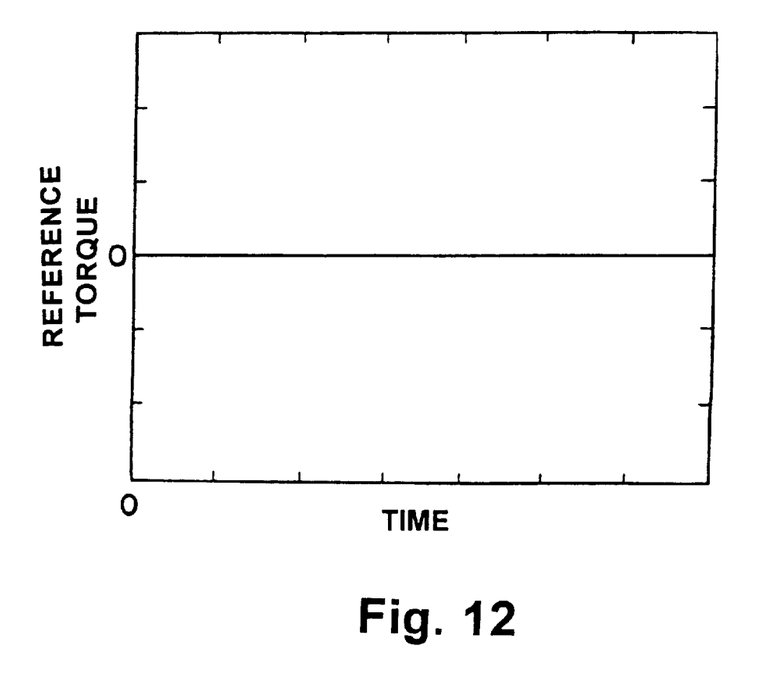
FIG. 12 is a figure showing an example of behavior of a conventional vehicle in lane changing, particularly time variation of reference torque, in comparison with the present embodiment.
Figure 13:
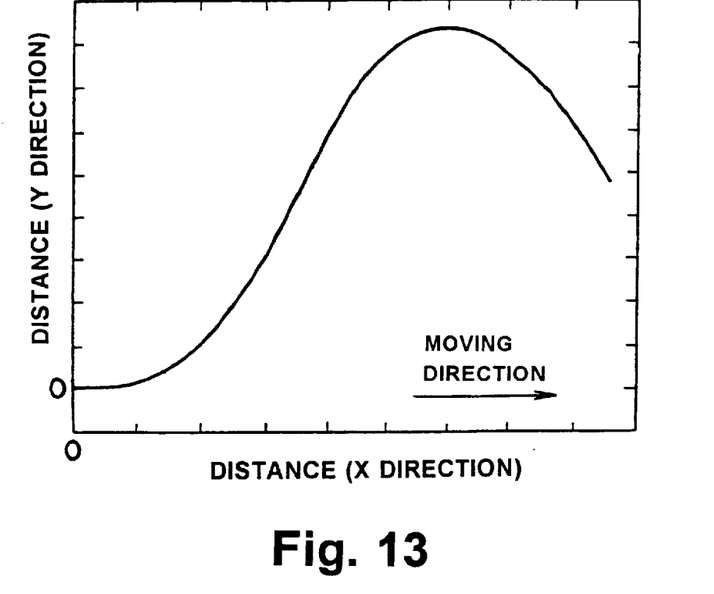
FIG. 13 is a figure showing an example of behavior of a conventional vehicle in lane changing, particularly two-dimensional running locus, in comparison with the present embodiment.
Figure 14:
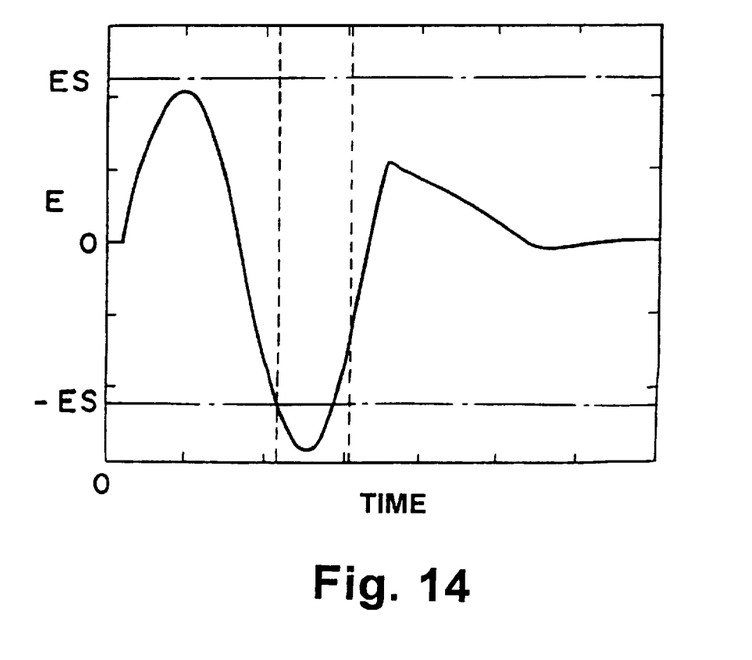
FIG. 14 is a figure showing behavior of a vehicle of the present embodiment in lane changing, particularly time variation of control error.
Figure 15:
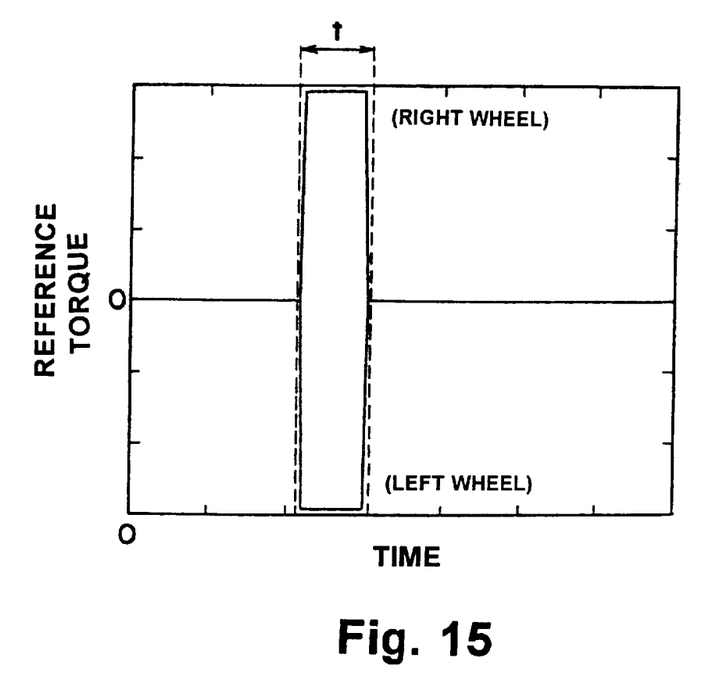
FIG. 15 is a figure showing behavior of a vehicle of the present embodiment in lane changing, particularly time variation of reference torque.
Figure 16:
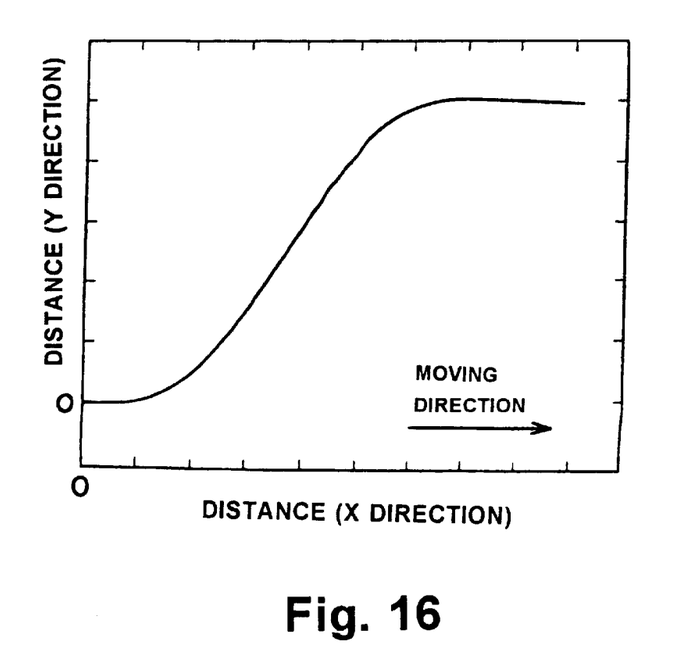
FIG. 16 is a figure showing behavior of a vehicle of the present embodiment in lane changing, particularly two-dimensional running locus.

In the present embodiment, a wheel-motor type EV having high running safety can be realized, compared with an EV without a running safety controlling means and a wheel-motor type EV disclosed in Japanese Patent Laid-Open Publication No. Hei. 5-91607, that is, an EV without any countermeasures for securing the running safety during turning or the like differently from the present embodiment. For example, in the case of lane changing, an EV which is not controlled by a method of the present embodiment shows the behavior as shown in FIGS. 11, 12, 13 in general. On the contrary, an EV of the present embodiment shows the behavior as shown in FIGS. 14, 15, 16. It can be easily understood by a person of ordinary skill in the art that the latter shows higher running stability than the former. FIGS. 11 and 14 show the variation of error information E (determined by the logic of the present embodiment) with time in the case of the execution of lane changing. FIGS. 12 and 15 show the variation of the reference torque with time in the case of the execution of lane changing. FIGS. 13 and 16 show the two dimensional variation of the vehicle position (running locus). Running safety in turning, speed changing, slip or the like can be also maintained and improved.

One of the reasons for such advantages is the determination of feedback torques ΔTR and ΔTL using error information E having a dimension of (angular) acceleration of a vehicle. That is to say, in the art disclosed in Japanese Patent Laid-Open Publication No. Hei. 5-91607, it is difficult to maintain running stability of a vehicle in turning or the like because angular acceleration of the vehicle is neglected. On the other hand, the present embodiment can easily maintain running stability. In addition, control of the running stability can be well executed because torque control is adopted instead of speed control for a motor. In addition, because control in the angular accelerative dimension is employed in the present embodiment, straight line stability of a vehicle can be maintained even under the conditions that cause a fear of deteriorating the straight line stability, for example, such as running on a so-called step μroad on which frictional coefficients of right and left road surfaces are different.

In addition, an EV of the present embodiment is superior to an engine drive vehicle and a one-motor type EV. For example, because an exclusive control unit and a hydraulic control system for TRC and ABS are not necessary in the present embodiment, the EV of the present embodiment can inexpensively realize the running safety of the vehicle compared with the engine drive vehicle having the same level of the running safety of the vehicle. In addition, because control for adding feedback torques ΔTR and ΔTL begins before pedal operation, frequencies of pedal operation by a driver are reduced. Consequently, operatability of the vehicle is improved. In addition, the above-mentioned advantages of a wheel-motor type EV compared with a one-motor type EV are still secured. In addition, because the brake system is divided into the hydraulic brake system for front wheels and the regenerative brake system for rear wheels, the brake system has simple configuration compared with that of conventional EVs as mentioned above.

(5) Notes

In the embodiment described above, Vγ*−Gy is used as error information E. Quantities such as VS·dβ/dt(=Gy−VS·γt, where β is slip angle, and t is time.), VS·γt, dγt/dt can be used as error information error E besides. Because these quantities have both merits and demerits, it is necessary to properly select them according to their intended use.

For example, quantity (Vγ*−Gy) quickly reflects the motion of a vehicle. Quantity (VS·dβ/dt) has high detection sensitivity and high accuracy. Stability factor A (consequently, preliminary measurement of stability factor A) is not necessary to calculate VS·dβ/dt. Quantity (VS·γt) quickly reflects the motion of a vehicle and does not need stability factor A to calculate it, and the modification for sensor output is small. Quantity (dγt/dt) does not require stability factor A for calculation. Quantity (dβ/dt) can be calculated from body speed VS, yaw rate γt, and lateral acceleration Gy.

In the embodiment described above, body speed VS is calculated from wheel speeds of front wheels VFR and VFL, steering angle δt, and yaw rate γt, but the present invention is not limited to such a method. For example, body speed VS may be calculated from wheel speeds of front wheels VFR and VFL and wheel speeds of rear wheels VRR and VRL, or from longitudinal acceleration Gx and steering angle δt, or from longitudinal acceleration Gx and wheel speeds of rear wheels VRR and VRL.

In addition, when output characteristics of the right and left vehicle running motors are the same, TN maps can be used in common in the respective vehicle running motors. Even when output characteristics of the right and left vehicle running motors are not the same, TN maps can be used in common by adopting such a technique that a TN map suitable for either of the right and left vehicle running motors is selected, and the referred result of the TN map are multiplied by the ratio of the right and left output characteristics when torque command for another vehicle running motor is calculated.

The embodiment described above shows an example of application of the present invention to a rear-wheel-drive EV. The present invention may be applied to a front-wheel-drive EV and a four wheel drive EV. A person of ordinary skill in the art can easily understand an application method for a front-wheel-drive EV by replacing the term "front wheels" with the term "rear wheels". As for the application to a four wheel drive EV, though modifications of the equations for calculating body speed VS and the like, and change of number and mode of inverters and the like to be provided are necessary, someone of ordinary skill in the art may easily understand the method. In addition, though the present embodiment shows a wheel-in-motor type permanent magnet excitation three phase AC motor as an example, the present invention may be realized using other types of motors having structures (wheel-in-motor type or not, etc.), excitation methods, and driving power types (DC or AC, phase number in the case of AC, etc.).

Block diagrams are used in the explanation of the embodiments. This is to clearly explain the functions, and does not limit the present invention to the hardware of the present embodiment. In the explanation of the functions of the vehicle controller, some parts of signal transducing and processing for the signals output from various kinds of sensors are omitted for simplification. In the case of using a pulse outputting type sensor as a wheel speed sensor, it is necessary in practice to execute the processing such as counting of output pulses in order to convert the number of pulses into the wheel speed or the rotational speed, which is easy to understand. In addition, the following are contained on a vehicle in practice; an auxiliary battery for supplying driving power to the vehicle controller and other outboard electrical appliances, a DC/DC converter for charging the auxiliary battery by converting the output voltage of a main battery into the lower voltage, a junction boxe for setting electrical connections between various onboard electric machinery including motors and auxiliary components, a function for detecting and controlling SOC (state of charge) of the main battery, a function for detecting abnormality and preventing failure of various onboard components, members for charging the main battery by output from exterior electrical sources, a function for giving an alarm and indication to a driver or the like. These are omitted for simplification.

What is claimed is:

1. A driving controller mounted onboard an electric vehicle provided with at least one driving wheel for a right side and at least one driving wheel for a left side of the electric vehicle and a vehicle running motor for every driving wheel, the driving controller comprising:

means for determining a reference torque as a reference value of output torque of the vehicle running motor for every vehicle running motor on the basis of driver's requirements;

means for directly or indirectly detecting acceleration or angular acceleration of the electric vehicle;

means for detecting US-OS characteristics of the electric vehicle; and reference torque correction means for correcting the reference torque for every vehicle running motor on the basis of the acceleration or the angular acceleration so that the US-OS characteristics shift toward a status of neutral steer when the US-OS characteristics show a tendency to deviate from the status of neutral steer.

2. A driving controller according to claim 1, wherein the reference torque correction means comprises;

means for determining an absolute value of a reference torque correction value such that the absolute value increases with an increase of the acceleration or the angular acceleration;

means for determining a sign of the reference torque correction value according to the US-OS characteristics so that the reference torque for an outside driving wheel relatively decreases after correction compared with the reference torque for an inside driving wheel in a case of oversteer, and on the contrary, increases in a case of understeer; and means for adding the reference torque correction value to the reference torque.

3. A driving controller according to claim 1 further comprising:

means for halting the correction when the acceleration or the angular acceleration is sufficiently small.

4. A driving controller according to claim 1 further comprising:

means for detecting slip ratios of respective driving wheels; and means for halting the correction when detected slip ratio of the corresponding driving wheel is not sufficiently small.

* * * * *